Feb. 26, 1929.

J. H. GRAHAM 1,703,444

PEDAL FOR BICYCLES AND THE LIKE

Filed March 27, 1928

Inventor:
James H. Graham
by Geo. K. Evans
Att'y.

Patented Feb. 26, 1929.

1,703,444

UNITED STATES PATENT OFFICE.

JAMES H. GRAHAM, OF TORRINGTON, CONNECTICUT.

PEDAL FOR BICYCLES AND THE LIKE.

Application filed March 27, 1928. Serial No. 265,135.

My invention relates to pedals for bicycles and the like.

The object of the invention is to provide a three-point bearing for the feet of the rider instead of the usual two-point bearing by utilizing the usual spindle sleeve for carrying a third tread.

The invention consists in mounting upon the spindle-sleeve, which lies between the two pedal blocks, a third tread piece consisting of a tubular member of rubber or equivalent material, so that the foot of the operator will rest at three points and so give a broader and firmer rest for the foot.

The above object I accomplish by the construction shown in the accompanying drawing, in which.

Figure 1:
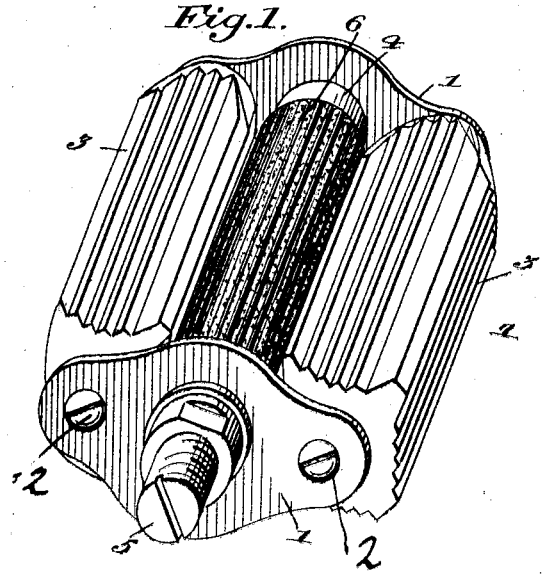
Fig. 1 is a perspective of a bicycle pedal of known construction to which my improvement is applied.
Figure 2:
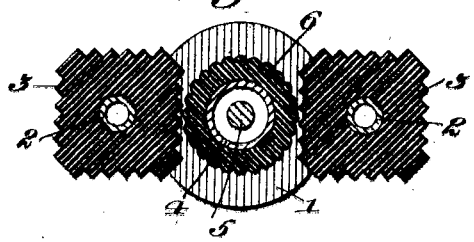
Fig. 2 is a transverse section on line 1—1 of Fig. 1.
Figure 3:
Fig. 3 shows the middle tread piece removed.

The pedal frame has the usual end plates 1, 1, pedal rods 2, 2, pedal bars or treads 3, 3, spindle sleeve 4 and spindle 5. These may be of an approved form.

Heretofore the spindle sleeve has been exposed between the treads 3—3, so that upon the wearing down of these treads the foot came in contact with the exposed sleeve 4 and so causing the foot to come into contact with a hard and unyielding surface to the discomfiture of the rider and also tending to cause the foot to slip. To obviate these objections I place a middle tread piece 6 upon the spindle sleeve which gives to the pedal a practically continuous bearing for the foot. The spindle sleeve thus serves an additional and highly useful purpose.

This middle tread 6 is preferably formed of a length of ordinary rubber tubing and is slipped endwise on the sleeve 4. It may be of the same external diameter as the two outer treads 3—3 so that the foot will rest on all three treads or it may be of less diameter so that it will be engaged by the foot upon the wearing down of the two outer treads and so afford a three-point bearing.

The middle tread 6 may be of a color to contrast with the usual treads 3—3 to give a pleasing effect upon the eye and it may be of any desired shape in cross section.

What I claim is:

A pedal for bicycles and the like comprising a frame, a spindle, a loose sleeve mounted on the said spindle, two spaced resilient treads, one at each side of the said sleeve, and a tubular resilient tread enclosing the said sleeve between the two spaced treads.

In testimony whereof I affix my signature.

JAMES H. GRAHAM.